United States Patent Office 3,142,650
Patented July 28, 1964

3,142,650
POLYURETHANES FROM TRIS-POLYPROPYLENE
GLYCOL PHOSPHITES
Lester Friedman, Beachwood Village, Ohio, assignor, by mesne assignments, to Union Carbide Corporation, a corporation of New York
No Drawing. Filed Sept. 5, 1961, Ser. No. 135,751
20 Claims. (Cl. 260—2.5)

This application is a continuation-in-part of my applications Serial No. 109,842, filed May 15, 1961, and now Patent 3,009,939, November 21, 1961, and Serial No. 129,529, filed August 7, 1961, and entitled "Condensates" and now Patent No. 3,081,331, March 12, 1963.

The present invention relates to the preparation of polyurethanes, including foamed polyurethanes, from phosphite esters containing available secondary hydroxyl groups.

It has been proposed in Trescher et al. Belgian Patent 593,966 to make polyurethanes by reacting a polyisocyanate with a tris (hydroxyalkylpolyoxyalkylene) phosphate or phosphite. No specific examples are given in Trescher et al. for making phosphites, and the only specific examples disclosed for making phosphates are the reaction of propylene oxide or a mixture of propylene oxide and ethylene oxide with phosphoric acid. This process will form tris dipropylene glycol phosphate, for example. Even if a large excess of propylene oxide is used, the product does not go beyond the dipropylene glycol stage. This is borne out by the hydroxyl numbers of the phosphates prepared by Trescher et al. The hydroxyl numbers are about 400 except in Example 5 in which the hydroxyl number is 346 and there was a relatively high acid number of 17.1 showing that there was incomplete esterification despite the use of a large excess of propylene oxide. If the reaction had proceeded beyond the formation of tris dipropylene glycol phosphate, e.g., to form tris tripropylene glycol phosphate, the hydroxyl number would have dropped to about 270. This is further shown in Adams Patent 2,372,244 wherein even with a ratio of about 13 moles of propylene oxide to one mole of phosphoric acid in Example I the product obtained was tris dipropylene glycol phosphate.

Trescher also mentions making phosphites by reacting phosphorous acid with propylene oxide or a polyoxyalkylene glycol. Phosphorous acid is known to act as a dibasic acid and it is not possible to form a tris polypropylene glycol phosphite by such a procedure. Adams shows, for example, in Example II that when 12 moles of propylene oxide are added to 1 mole of phosphorous acid the product is bis dipropylene glycol phosphite. As shown by Adams' Examples I and II, when propylene oxide is reacted with phosphoric acid or phosphorous acid, the terminal hydroxyl groups are primary hydroxyl groups.

When Example 1 of Trescher was repeated by the present inventor, he obtained 604 grams of tris dipropylene glycol phosphate as a clear, colorless liquid. However, attempts to make a stable foam in accordance with the directions of Trescher's Example 1 proved to be unsuccessful since in every case, while the product frothed, the foam produced collapsed. It was not possible to cure the Trescher foam.

In another experiment, 140 grams of phosphorous acid were heated to 90° C. on a steam bath with stirring. 500 ml. of propylene oxide were added while keeping the temperature between 85–95° C. with external cooling. The reaction was exothermic. The mixture was then heated at 85° C. for one-half hour and then to 120° C. and stripped on the water pump to yield 521 grams of product. Infrared analysis showed strong P=O and pH bonds, indicative of a hydrogen phosphonite. The product was bis dipropylene glycol phosphite.

It is an object of the present invention to prepare urethanes from tris polypropylene glycol phosphites.

Another object is to prepare stable, foamed urethanes from tris polypropylene glycol phosphites.

A further object is to prepare urethanes, particularly foamed urethanes, from tris polypropylene glycol phosphites wherein the polypropylene group is higher than the dipropylene group.

An additional object is to prepare polyurethanes from tris polypropylene glycol phosphites wherein the majority of the hydroxyl groups available in the phosphites are secondary alcohol groups.

A further object is to prepare polyurethanes from compositions containing tris polypropylene glycol phosphites alone or admixed with hydroxyl terminated polyols which compositions have a hydroxyl number of between 25 and 125, and preferably between 35 and 100.

Yet another object is to prepare novel flame-resistant polyurethanes.

A further object is to prepare curable polyurethane foams.

A still further object is to prepare polyurethanes having built-in stabilization properties.

Another object is to prepare phosphorus containing polyurethanes which are more hydrophobic than the polyurethanes containing phosphate groupings.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting a tris polypropylene glycol phosphite with an organic polyisocyanate to form a polyurethane. The tris polypropylene glycol phosphites are prepared in the manner described in my aforementioned applications. The free hydroxyl groups present on the phosphites are primarily secondary hydroxyl groups, e.g., generally over 50% of the hydroxyl groups present are secondary and usually the vast majority of the groupings present (e.g., about 90%) will have this secondary alcohol relationship. In the specific examples the tris polypropylene glycol phosphites employed were those described in the examples in my aforementioned applications and had about 90% secondary alcohol groups.

The tris polypropylene glycol phosphites which can be employed include, for example, tris dipropylene glycol phosphite, tris tripropylene glycol phosphite, tris polypropylene glycol 425 phosphite, tris polypropylene glycol 1025 phosphite, tris polypropylene glycol 2025 phosphite, and tris polypropylene glycol 3000 phosphite and tris polypropylene glycol 5000 phosphite.

The tris polypropylene glycol phosphites can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternatively, foams can be prepared by uniformly distributing a liquefied halogen substituted alkane containing at least one fluorine atom in its molecule in liquid and having a boiling point at one atmosphere pressure not higher than 80° F. and preferably not lower than −60° F. in either the polypropylene glycol phosphite (or mixture of phosphite and other polyhydroxy compound) reactant or the polyisocyanate reactant and then mixing the reactants and permitting the temperature of the mixture to rise during the ensuing reaction above the boiling point of the liquefied gas to produce a porous polyurethane. Such fluorine containing compounds include dichlorodifluoromethane, dichloromonofluoromethane, chlorodifluoromethane, and dichlorotetrafluoroethane. The foams can be formed with such fluorine containing compounds in the manner described in General Tire British Patent 821,342.

Foamed polyurethanes can be made by either the one shot or two step procedures. In the case of tris dipropylene glycol phosphite or tris polypropylene glycol 425 and toluene diisocyanate in order to form a good foam it has been found desirable to employ the two step procedure unless an additional polyhydroxy reactant is added to lower the hydroxyl number of the hydroxy reactants to below 125 and preferably below 100, e.g., as low as 25, but preferably at least 35.

In preparing urethane foams according to the invention a rigid foam is made by utilizing a polypropylene glycol phosphite (or mixture of such phosphite and another polyhydroxy containing compound) having a hydroxyl number of 350–750; a semi-rigid foam is prepared if the hydroxyl number is 75–350, and a flexible foam is prepared if the hydroxyl number is 35–75.

The polyurethanes prepared according to the present invention are solids. They have good flameproofing properties and in the foamed form are useful as linings for textiles, e.g., coats, suits and dresses, insulation in building construction, upholstery filling material, pillows, hair curlers, brushes, carpet underlays or backings, etc.

The unfoamed polyurethane products are useful wherever elastomeric polyurethanes can be employed with the advantage of improved flame and fire resistance. The elastomers in thread form can be employed in making girdles. The unfoamed polyurethanes are suitable for molding cups and other articles, and as protective coatings for steel, wood and glass.

The polyurethanes can be cured in conventional fashion, e.g., in an oven at 110° C.

As examples of organic polyisocyanates which can be employed to make the polyurethane there can be employed toluene-2,4-diisocyanate, toluene-2,6-diisocyanate, 4-methoxy-1,3-phenylene diisocyanate, diphenyl methane-4,4'-diisocyanate, 4-chloro-1,3-phenylene-diisocyanate, 4-isopropyl - 1,3 - phenylene - diisocyanate, 4 - ethoxy - 1,3-phenylene - diisocyanate, 2,4-diisocyanato - diphenylether, 3,3'-dimethyl-4,4'-diisocyanatodiphenyl methane, mesitylene diisocyanate, durylene diisocyanate, 4,4'-methylenebis (phenylisocyanate), benzidine diisocyanate, o-nitrobenzidine diisocyanate, 4,4'-diisocyanatodibenzyl, 3,3'-bitolylene-4,4'-diisocyanate, 1,5-naphthalene diisocyanate, tetramethylene diisocyanate, hexamethylene diisocyanate, decamethylene diisocyanate, toluene - 2,4,6 - triisocyanate, tritolylmethane triisocyanate, and 2,4,4'-triisocyanatodiphenyl ether, the reaction product of toluene diisocyanate with trimethylolpropane at an NCO/OH ratio of 2:1 (Mondur CB), the reaction product of toluene diisocyanate with 1,2,6-hexanetriol at an NCO/OH ratio of 2:1, the reaction product of toluene diisocyanate with the tris polypropylene glycol phosphite at an NCO/OH ratio of 2:1, e.g., when the tris polypropylene glycol phosphite is tris dipropylene glycol phosphite or is tris polypropylene glycol 2025 phosphite.

Alternatively, as the polyisocyanate there can be used prepolymers made by reacting one or more of the above polyisocyanates with a polyhydroxy compound such as a polyester having terminal hydroxyl groups, a polyhydric alcohol, glycerides, hydroxy containing glycerides, etc. The prepolymers should have terminal isocyanate groups. To insure this it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20% 2,6-isomer of toluene diisocyanate was employed in making the prepolymer. Thus, there can be used the prepolymers from toluene diisocyanate and castor oil, toluene diisocyanate and blown tung oil (or blown linseed oil or blown soya oil), toluene diisocyanate and the polyester of ethylene glycol, propylene glycol and adipic acid having a molecular weight of 1900 described in Example I of Kohrn Patent 2,953,839, as well as the isocyanate terminated prepolymers in Examples II–VIII, inclusive, of the Kohrn patent, toluene diisocyanate and polytetramethylene glycol (1000 molecular weight), toluene diisocyanate and polypropylene glycol (molecular weight 2025), toluene diisocyanate and dipropylene glycol, toluene diisocyanate and polypropylene glycol (molecular weight 1025), toluene diisocyanate and LG–56 (glycerine-propylene oxide adduct having a molecular weight of 3000), toluene diisocyanate and 1,2,6-hexanetriol-propylene oxide adducts having molecular weight of 500, 700, 1500, 2500, 3000 and 4000, hexamethylene diisocyanate and pentaerythritol, toluene diisocyanate and polyethylene sebacate, toluene diisocyanate and a mixture of 98% polypropylene glycol (molecular weight 1900) with 2% 1,2,6-hexanetriol, toluene diisocyanate and a copolymer of ethylene oxide and propylene oxide having a molecular weight of 2020, toluene diisocyanate and glyceryl adipate phthalate polymer, toluene diisocyanate and a mixture of polypropylene ether glycol molecular weight 995 and castor oil as described in Example 2 of Kane Patent 2,955,091, as well as the other prepolymers set forth in Example 1 and 3–11 of Kane, toluene diisocyanate and polypropylene ether glycol (molecular weight 1800) of Example I of Swart Patent 2,915,496 and the prepolymers of Examples II, III, VI and VIII of the Swart patent.

As previously stated, the tris polypropylene glycol phosphites can be the sole hydroxyl reactant present or they can be used in admixture with other polyhydroxy compounds in forming the polyurethanes. Examples of such compounds are polyethylene glycols having molecular weights of 400 to 3000, polyproplyene glycols having molecular weights of 400 to 3000, ethylene glycol, diethylene glycol, triethylene glycol, propylene glycol, dipropylene glycol, tripropylene glycol, 1,4-butanediol, thiodiglycol, glycerol, trimethylolethane, trimethylolpropane, ether triols from glycerine and propylene oxide having molecular weights of 1000 and 3000 (available commercially as LG–168 and LG–56, respectively), ether containing triols from 1,2,6-hexanetriol and propylene oxide having molecular weights of 750, 1500, 2400 and 4000 (available commercially as LHT 240, LHT 112, LHT 67 and LHT 42, respectively), sorbitol-propylene oxide adduct having a molecular weight of 1000, pentaerythriol-propylene oxide adduct having a molecular weight of 1000, trimethylol phenol, oxypropylated sucrose, triethanolamine, pentaerythritol, diethanolamine, castor oil, blown linseed oil, blown soya oil, N,N,N',N'-tetrakis (2-hydroxyethyl) ethylenediamine, mixed ethylene glycolpropylene glycol adipate resin (molecular weight 1900), polyethylene adipate phthalate, polyneopentylene sebacate, the product made by reacting an excess of 1,4-butanediol with adipic acid and including a small amount of a triol, e.g., one molar equivalent of trimethylol propane for each 3000 to 12,000 molecular weight units of polyester, polyester from 16 moles adipic acid, 16 moles diethylene glycol and 1 mole of trimethylol propane, oxypropylated p-tertiary butylphenol-formaldehyde resin of Example 2b of De Groote Patent 2,499,365 and the other oxyalkylated resins of De Groote.

From 5 to 100% by weight of the hydroxyl component can be the tris-polypropylene glycol phosphite. When employing tris-dipropylene glycol phosphite, tris-tripropylene glycol phosphite, or tris-polypropylene glycol 425 phosphite to prepare foams, preferably 5–85% of the hydroxyl containing substance is such material and the balance is tris-polypropylene glycol 1025 phosphite or tris-polypropylene glycol 2025 phosphite, or LG–56, or polypropylene glycol 2025 or other polyol which will reduce the hydroxyl number to below 100 and preferably to between 30 and 75.

The tris-polypropylene glycol phosphites also can be employed as light stabilizers for polyurethane resins made from any of the nonphosphorus containing polyols set forth above. For such use the phosphite is employed in an amount of from 0.1–15% by weight of the polyol, e.g., 3% by weight of tris-dipropylene glycol phosphite is added to 14.4 grams of LG–56. Conventional catalysts and surfactants are also employed. This mixture is stable and can be added to 5.2 grams of toluene diisocyanate and 0.37 gram of water to form a light stable foamed polyurethane. The tris-polypropylene glycol phosphites not only act to stabilize the polyol employed as well as the polyurethane product but also serve as reactants.

In repairing the cured and/or foamed polyurethanes any of the conventional basic catalysts can be used. These include N-methyl morpholine, N-ethyl morpholine, trimethyl amine, triethyl amine, tributyl amine and other trialkyl amines, the esterification product of 1 mole of adipic acid and 2 moles of diethylethanolamine, triethyl amine citrate, 3-morpholinopropionamide, 2-diethylaminoacetamide, 3-diethylaminopropionamide, diethylethanolamine, triethylenediamine, N,N,N′,N′-tetrakis (2-hydroxypropyl) ethylenediamine (Quadrol), N,N′-dimethylpiperazine, N,N-dimethylhexahydroaniline, tribenzylamine and sodium phenolate. There can also be used tin compounds, e.g., hydrocarbon tin acylates such as dibutyltine dilaurate, dibutyltin diacetate, dibutyltin dioctoate, tributyltin monolaurate, dimethyltin diacetate, dioctyltin diacetate, dilauryltin diacetate, dibutyltin maleate, hydrocarbon tin alkoxides, e.g., dibutyl-tin diethoxide, dibutyltin dimethoxide, diethyltin dibutoxide as well as other tin compounds, e.g., octylstannoic acid, trimethyltin hydroxide, trimethyltin chloride, triphenyltin hydride, triallyltin chloride, tributyltin fluoride, dibutyltin dibromide, bis (carboethoxymethyl) tin diiodide, tributyltin chloride, trioctyltin acetate, butyltin trichloride, octyltin tris-(thiobutoxide), dimethyltin oxide, dibutyltin oxide, dioctyltin oxide, diphenyltin oxide, stannous octanoate, stannoleate, as well as the other tin compounds set forth in Hostettler French Patent 1,212,252.

Conventional surfactants can be added in an amount of 1% or less, e.g., 0.2% by weight of the composition. The preferred surfactants are silicones, e.g., polydimethyl siloxane having a viscosity of 3 to 100 centistokes, triethoxydimethyl polysiloxane, molecular weight 850, copolymerized with a dimethoxypolyethylene glycol having a molecular weight of 750, as well as any of the other siloxanes disclosed in Hostettler French Patent 1,212,252.

Unless otherwise indicated, all parts and percentages are by weight.

In preparing polyurethanes the following values are of interest.

| Compound | Molecular Weight | OH Number | OH Equivalent In Grams[1] |
|---|---|---|---|
| Tris-dipropylene glycol phosphite | 430 | 392 | 1.99 |
| Tris-tripropylene glycol phosphite | 556 | 303 | 2.66 |
| Tris-polypropylene glycol 425 phosphite | 1,306 | 129 | 6.25 |
| Tris-polypropylene glycol 1025 phosphite | 3,106 | 54 | 14.4 |
| Tris-polypropylene glycol 2025 phosphite | 6,106 | 27.5 | 28.2 |

[1] Equivalent to 14.4 grams of LG–56.

In the following examples, unless otherwise indicated, the toluene diisocyanate employed was a mixture of 80% of the 2,4-isomer and 20% of the 2,6-isomer.

In preparing one shot foams there was utilized the following standard formulation:

| | Grams |
|---|---|
| Water | 0.37 |
| Dibutyltin dilaurate | 0.07 |
| Polydimethyl siloxane (50 centistokes grade) | 0.12 |
| N-ethyl morpholine | 0.1 |
| Polyol | As indicated |

This mixture is designated in the following examples as Formulation A.

Foams were made by adding Formulation A to 5.2 grams of the toluene diisocyanate. The foams were then cured in a 110° C. oven for about 20 minutes.

In a comparison or control example there was employed 14.4 grams of LG–56 as the polyol. Utilizing a 10 ounce cup the LG–56 foam rose 1.5 inches above the top of the cup.

Example 1

The polyol used in Formulation A was a mixture of 1 ml. (about 1 gram) of tris-dipropylene glycol phosphite and 7 grams of LG–56. Upon addition of the 5.2 grams of toluene diisocyanate the cream time was 8 seconds and there was a fairly rapid rise. After 10 minutes of rise the foamed product was cured at 110° C. for 20 minutes. There was obtained a good foam with some closed cells. The foam rose 1.5 inches above the top of the cup and had a much lower density than the LG–56 foam.

When Example 1 was repeated, the same results were obtained showing that the results were reproducible. The foam was semi-rigid in nature.

Example 2

The polyol used in Formulation A was a mixture of 1 ml. (about 1 gram) of tris-dipropylene glycol phosphite and 7 grams of polypropylene glycol 2025. After addition of the 5.2 grams of toluene diisocyanate, the cream began in 8 seconds and there was a fairly rapid rise. There was a large volume 3 inches above the cup top. After curing at 110° C. for 20 minutes there was a nice foam which was somewhat harder than that in the LG–56 comparison example.

In Example 2 and the other foam examples Silicone fluid 520 was equally effective when employed in place of the polydimethyl siloxane in the same amount.

Example 3

The polyol used in Formulation A was 3.1 ml. (about 3 grams) of tris-polypropylene glycol 425 phosphite and 7 grams of polypropylene glycol 2025. After addition of the 5.2 grams of toluene diisocyanate the cream time was 10 seconds. There was a nice soft foam with some closed cells.

Example 4

The polyol used in Formulation A was 6.1 ml. (about 6 grams) of tris-polypropylene glycol 425 phosphite and 7 grams of polypropylene glycol 2025. After addition of 5.2 grams of toluene diisocyanate there was obtained a very nice soft foam with a few closed cells and a nice density. The formulation contained excess hydroxyl groups.

Example 5

The polyol used in Formulation A was 9 grams of tris-polypropylene glycol 425 phosphite and 3 grams of polypropylene glycol 2025. The 5.2 grams of toluene diisocyanate was added and a very nice soft foam with some closed cells was produced.

Example 6

Formulation A was used omitting the water and employing 6.05 grams of tris-polypropylene glycol 425 phosphite. There was then added 5.2 ml. of toluene diisocyanate (about 5.2 grams) and the mixture allowed to react to form a prepolymer. There was then added 0.37 ml. of water and after a moderate cream time there was a nice rise to give a nice light foam. After curing at 110° C. for 20 minutes there was slight shrinkage. The product was semi-rigid with some closed cells.

*Example 7*

Formulation A was used with a mixture of 1.50 ml. of tris-dipropylene glycol phosphite (about 1.50 grams) and 4.0 grams of polypropylene glycol 2025 as the polyol. Upon addition of 5.2 grams of toluene diisocyanate there was a moderate cream time and a fast rise to give a nice foam with closed cells. During cure the foam was hand crushed to break open the closed cells. The product was nice and had a very low density.

*Example 8*

Example 7 was repeated but there was used only 4.9 grams of toluene diisocyanate. There was not as much blow but a better foam with less closed cells was produced.

*Example 9*

The polyol used in Formulation A was trisdipropylene glycol phosphite in an amount of 1.99 grams. The water was omitted from Formulation A. There was added 5.2 grams of toluene diisocyanate. After prepolymer formation was complete as indicated by a temperature rise to about 90° C. followed by allowing the product to cool to 30° C. (about 35 minutes were required), the 0.37 grams of water was added with stirring. The product was a rigid foam.

*Example 10*

The polyol used in Formulation A was 14.4 grams of tris-polypropylene glycol 1025 phosphite. After adding 5.2 grams of toluene diisocyanate there was a nice cream and rise time. Some closed cells were noted. After curing in the oven at 110° C. for 20 minutes the foam had good tensile strength and tear strength as well as a nice feel.

*Example 11*

The polyol used in Formulation A was 28.2 grams of tris-polypropylene glycol 2025 phosphite. After adding 5.2 grams of toluene diisocyanate there was a slow cream and rise time. No closed cells were noted. The cured product (110° C. for 20 minutes) was an extremely nice foam and after standing for 12 days had a very high tensile strength.

*Example 12*

Forty-three grams (0.1 mole) of tris-dipropylene glycol phosphite, 28.7 grams (0.165 mole) of toluene diisocyanate (80/20 2,4/2,6 isomer ratio) were heated together at 90° C. for one hour and dissolved in 100 ml. of dimethyl formamide and portions of the product were painted on (a) a glass petri dish, (b) a steel plate and (c) a piece of wood. The samples were placed in an oven at 120° C. for one hour to remove the solvent and then air cured for 4 hours. In all cases a hard clear tough resin coating was obtained. The coating did not burn and acted as a fire retardant. The polyurethane was useful therefore as a nonburning paint.

*Example 13*

The polyol employed in Formulation A was a mixture of 7.2 grams of tris-polypropylene glycol 1025 phosphite and 7 grams of a polyester of molecular weight about 2000, hydroxyl number of 62.4 and acid number of 0.4 made from adipic acid and a mixture of 50% diethylene glycol and 50% 1,5-pentanediol to produce a nice cured foam.

*Example 14*

The procedure of Example 12 was repeated replacing the tris-dipropylene glycol phosphite by 0.1 mole of tris-polypropylene glycol 2025 phosphite to obtain a good fire-resistant resin coating on the glass, steel and wood.

*Example 15*

The polyol employed in Formulation A was 14 grams of LG-56 to which had been added 0.4 gram of tris-polypropylene glycol 1025 phosphite as a stabilizer. After addition of the 5.2 grams of toluene diisocyanate there was produced a nice foam which was cured at 110° C. for 20 minutes.

*Example 16*

The procedure of Example 15 was repeated but the tris-polypropylene glycol 1025 phosphite was replaced by 0.1 gram of tris-dipropylene glycol phosphite.

I claim:
1. A polyurethane comprising the reaction product of a polyhydroxy compound containing alcoholic hydroxyl groups comprising a tris-polypropylene glycol phosphite and an organic polyisocyanate, the majority of the free hydroxyl groups on said phosphite being secondary hydroxyl groups.
2. A product according to claim 1 wherein the polyisocyanate is an aromatic diisocyanate.
3. A product according to claim 2 wherein the diisocyanate is toluene diisocyanate.
4. A foamed polyurethane comprising the reaction product of a polyhydroxy compound containing alcoholic hydroxyl groups comprising a tris-polypropylene glycol phosphite and an organic polyisocyanate and a foaming agent selected from the group consisting of water and a liquefied halogen substituted alkane containing at least one fluorine atom and having a boiling point at one atmosphere pressure not higher than 80° F., the majority of the free hydroxyl groups on said phosphite being secondary hydroxyl groups.
5. A product according to claim 4 wherein the polyisocyanate is an aromatic diisocyanate.
6. A product according to claim 5 wherein the polyhydroxy compound reacted with the diisocyanate has a hydroxyl number of between 25 and 125.
7. A product according to claim 6 wherein the sole polyhydroxy compound employed is a tris-polypropylene glycol phosphite, said phosphite having a majority of free secondary hydroxyl groups.
8. A product according to claim 6 wherein the polyhydroxy compound is a mixture of a tris-polypropylene glycol phosphite having a majority of free secondary hydroxyl groups with up to 95% of a different polyhydroxy compound containing alcoholic hydroxyl groups.
9. A product according to claim 1 wherein the polyhydroxy compound reacted with the polyisocyanate has a hydroxyl number of between 25 and 125.
10. A product according to claim 9 wherein the sole polyhydroxy compound employed is a tris-polypropylene glycol phosphite having a majority of free secondary hydroxyl groups.
11. A product according to claim 9 wherein the polyhydroxy compound is a mixture of a tris-polypropylene glycol phosphite having a majority of free secondary hydroxyl groups with up to 95% of a different polyhydroxy compound containing alcoholic hydroxyl groups.
12. A flexible foamed polyurethane comprising the reaction product of at least one polyhydroxy compound containing alcholic hydroxyl groups including a tris-polypropylene glycol phosphite, the majority of the free hydroxyl groups on said phosphite being secondary hydroxyl groups, and an organic polyisocyanate and a foaming agent selected from the group consisting of water and a liquefied halogen substituted alkane containing at least one fluorine atom and having a boiling point at one atmosphere pressure not higher than 80° F. said polyol having a hydroxyl number of between 35 and 100.
13. A polyurethane according to claim 12 wherein the polyisocyanate is an aromatic diisocyanate.
14. A polyurethane according to claim 12 wherein the polyhydroxy compound is a mixture of said tris-polypropylene glycol phosphite with 5–95% of a polyether polyhydroxy compound consisting of carbon, hydrogen and oxygen and said polyisocyanate is an aromatic diisocyanate.

15. A polyurethane consisting essentially of the reaction product of (1) a hydrocarbon polyether polyhydroxy compound containing alcoholic hydroxyl groups containing 0.1–5% of a tris-polypropylene glycol phosphite in which the majority of the free hydroxyl groups are secondary hydroxyl groups as a reactive stabilizer and (2) an organic polyisocyanate.

16. A composition comprising a hydrocarbon polyether polyhydroxy compound containing alcoholic hydroxyl groups containing 0.1–15% of a tris-polypropylene glycol phosphite in which the majority of the free hydroxyl groups are secondary hydroxyl groups as a stabilizer therefor.

17. A polyurethane according to claim 15 wherein said polyhydroxy compound has a hydroxyl number between 35 and 100.

18. A polyurethane according to claim 12 wherein the polyhydroxy compound is a mixture of tris-dipropylene glycol phosphite with 5–95% of a polyether polyhydroxy compound containing alcoholic hydroxyl groups consisting of carbon, hydrogen and oxygen and said polyisocyanate is an aromatic diisocyanate.

19. A polyurethane according to claim 12 wherein the tris-polypropylene glycol phosphite is tris-polypropylene glycol molecular weight 1025 phosphite.

20. A polyurethane according to claim 1 wherein the tris-polypropylene glycol phosphite is tris-polypropylene glycol molecular weight 2025 phosphite.

References Cited in the file of this patent

UNITED STATES PATENTS 3,009,939    Friedman _____ Nov. 21, 1961

OTHER REFERENCES

Germany, Auslegeschrift 1,106,489, May 10, 1961 (Trescher et al.) F29159 Nb/39b KL39b.